United States Patent [19]

Sato et al.

[11] Patent Number: 4,566,103
[45] Date of Patent: Jan. 21, 1986

[54] METHOD FOR RECOVERING FROM ERROR IN A MICROPROGRAM-CONTROLLED UNIT

[75] Inventors: Kiyosumi Sato, Kawasaki; Kazuyuki Shimizu, Machida, both of Japan

[73] Assignee: Fujitsu Limited, Kawasaki, Japan

[21] Appl. No.: 534,134

[22] Filed: Sep. 20, 1983

[30] Foreign Application Priority Data

Sep. 28, 1982 [JP] Japan .................. 57-168912

[51] Int. Cl.⁴ .................................. G06F 11/00
[52] U.S. Cl. ........................ 371/12; 364/200; 371/38
[58] Field of Search .............. 371/12, 13, 38, 16; 364/200, 900

[56] References Cited

U.S. PATENT DOCUMENTS

| | | | |
|---|---|---|---|
| 4,112,502 | 9/1978 | Scheuneman | 371/13 X |
| 4,231,089 | 10/1980 | Lewine et al. | 364/200 |
| 4,319,356 | 3/1982 | Kocol et al. | 371/38 |
| 4,443,849 | 4/1984 | Ohwada | 364/200 |

Primary Examiner—Charles E. Atkinson
Attorney, Agent, or Firm—Staas & Halsey

[57] ABSTRACT

An erroneous microinstruction and related preceding microinstructions are subjected to a so-called retry operation so as to restore the microprogram-controlled unit and correct the error. The retry operation is carried out under an interlock mode, in which both detection and correction occur prior to processing for each microinstruction. At the same time, an address specifying a thus detected erroneous microinstruction is recorded. When the recorded address is next generated, the interlock mode is automatically entered for the erroneous microstruction only.

10 Claims, 5 Drawing Figures

METHOD FOR RECOVERING FROM ERROR IN A MICROPROGRAM-CONTROLLED UNIT

BACKGROUND OF THE INVENTION

1. Field of the Invention

The present invention relates to a microprogram-controlled unit, more specifically to a method of error detection and correction for microinstructions in a unit operated by microprograms, such as a so-called pipeline processor.

2. Description of the Prior Art

An error checking code (ECC) is usually added to each microinstruction to be stored in a control storage of a microprogram-controlled unit to increase microinstruction reliability. When decoded, the ECC make it possible to check whether the microinstruction is correct or includes an error. Conventionally, the ECC decoding operation is effected in parallel with the execution of the microinstruction read from the control storage. This is because it takes a relatively long time to decode the ECC. Sequential operation of the ECC decoding operation and execution of the microinstruction would therefore adversely affect the operation speed of the microprogram-controlled unit.

During the parallel ECC decoding operation and microinstruction execution, detection of any error immediately stops the execution of the erroneous microinstruction. The microinstruction is then corrected and reexecuted in a "retry" operation. If the error is in a fixed bit in the control storage, however, the above process is repeated each time the microinstruction including that erroneous bit is specified. This reduces the efficiency of the microprogram-controlled unit. This problem is particularly severe in a pipeline processor. In such a processor, a plurality of microinstructions are executed simultaneously. Therefore, the retry operation must include not just the erroneous microinstruction, but a few of the microinstructions which preceded the erroneous microinstructions.

SUMMARY OF THE INVENTION

It is an object of the present invention to overcome a problem of reduced efficiency in a microprogram-controlled unit by recovering from a fixed error in a short time.

The above object is attained by a method wherein an initial retry operation is effected under an interlock mode. In the initial retry operation, the microinstruction containing an erroneous bit in the control storage and some of the preceding microinstructions are first processed to detect and correct errors and then reexecuted, as in the conventional manner. Simultaneously, the address specifying the erroneous microinstruction is recorded. When the address specifying the erroneous microinstruction is accessed in the control storage again, the processor operates under the interlock mode but only for the previously detected erroneous microinstruction to avoid repeating the retry operation.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
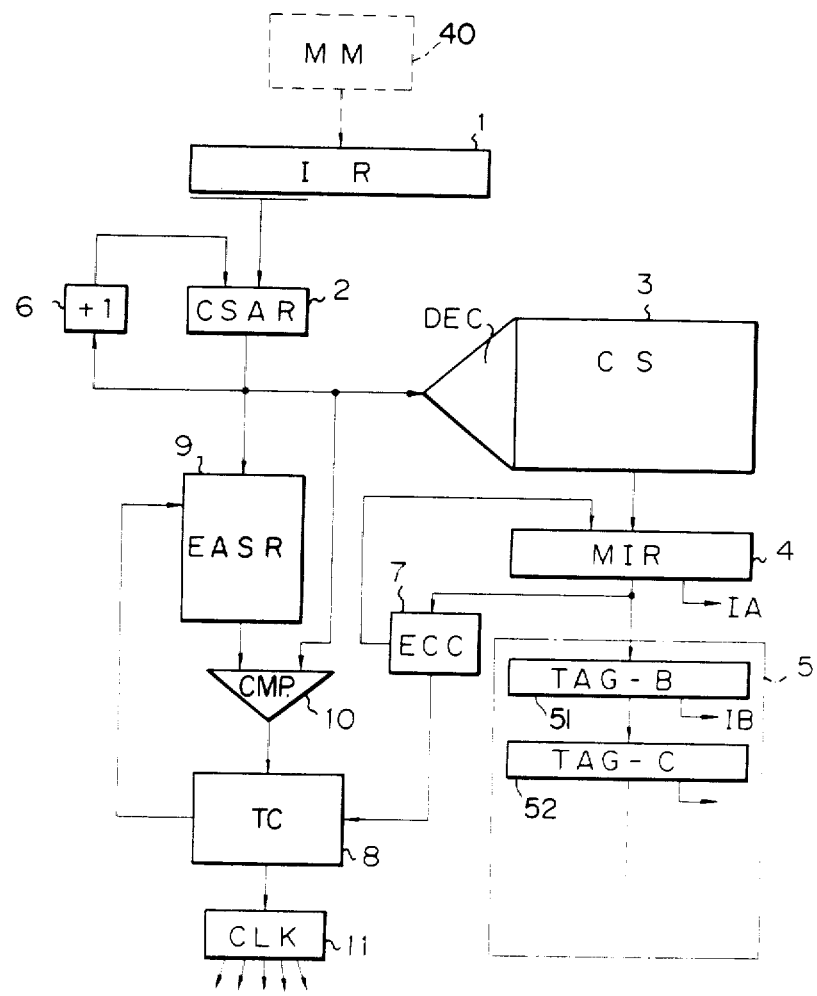
FIG. 1 is a block diagram of a circuit adapted to carry out an embodiment of the method of the present invention.

FIG. 1 is a diagram of a circuit adapted to carry out an embodiment of the method of the present invention. In FIG. 1, reference numeral 1 represents an instruction register (IR). Each instruction stored in the IR 1 is an absolute instruction supplied from a main memory (MM) 40. Initial values from the registered instructions, i.e., the operation code parts, are loaded into a control storage address register (CSAR) 2. In other words, addresses are stored in the CSAR 2 specifying microinstructions in a control storage (CS) 3. Successive microinstructions for the absolute instruction loaded in the IR 1 are sequentially and automatically read from the control storage 3 by means of an address increment circuit (+1) 6, which increments the address in the CSAR 2 every time an address is supplied to a decoder DEC of the control storage 3. In other words, incremental addresses specifying successive microinstructions in the storage 3 are generated in the control CSAR 2 with the aid of the increment circuit 6. Alternatively, the so-called next address method may be employed to locate successive microinstructions.

Each microinstruction is read from the control storage 3 and loaded directly into a microinstruction register (MIR) 4. Each microinstruction is transferred sequentially to tags B, C, and so on in a pipeline processing unit 5 for storage until use as microinstructions IA, IB, and so on. The tags B, C, and so on function as registers storing the microinstructions processed by the pipeline processing unit 5 and controlling execution at various stages. Simultaneously with the processing by the pipeline processing unit 5, the content of the MIR 4 is checked by means of an error detection and correction (ECC) circuit 7. If the ECC circuit 7 indicates there is no error, the content of MIR 4 is sequentially transferred, as mentioned above, to the tags B, C and so on.

However, if the ECC circuit 7 indicates there is an error, the processing in the pipeline processing unit 5 is immediately stopped. Shortly thereafter, a retry operation commences. The retry operation must be performed not only on the erroneous microinstruction, but also on some of the preceding microinstructions. That is, the retry operation is performed by returning to the initial microinstruction of the absolute instruction received from the main memory 40. This is necessary since there is a possibility that, in pipeline processing, the initial microinstruction is not yet completed when the erroneous microinstruction is detected.

According to the present invention, the retry operation is performed in an interlock mode. The term "interlock" here means that the ECC circuit 7 checks each microinstruction by ECC, corrects any erroneous microinstruction it detects, and rewrites the correct microinstruction into the MIR 4. After this, one step is inserted into each process of the CSAR 2, the control storage 3, the MIR 4, and tags B, C, and so on, to synchronize the operations in the processor. During the retry operation, the ECC circuit 7 also performs the correction process for correct microinstructions, however, they are essentially unchanged as they are not erroneous.

After the absolute instruction has been completely processed under the interlock mode, the next absolute instruction is loaded into the register IR 1 from the main memory (MM) 40. The new absolute instruction specifies corresponding pipeline microinstructions stored in the control storage 3. These microinstructions will be executed in parallel with the decoding operation by using their respective ECC's, as usual.

During the retry operation, the address specifying the erroneous microinstruction is recorded in an error address storing register (EASR) 9. Once recorded, the error address is continuously compared by a comparing circuit 10 with the address indicated by the CSAR 2. When there is coincidence, i.e., the address of the erroneous microinstruction is in the CSAR 2, the processor operates under the interlock mode for that erroneous microinstruction only. In the interlock mode, an additional step must be inserted, for each of the elements of the processor mentioned previously. The insertion of the step is effected by a timing control circuit (TC) 8 and a clock control circuit (CLK) 11.

It should be understood that the ESAR 9 may record a plurality of error addresses. Thus, if two or more error bits exist in the control storage 3, the ESAR 9 can record them. In this case, one must provide a plurality of comparing circuits. When any one of the comparing circuits indicates a coincidence, the processor will then operate under the interlock mode for the related microinstruction.

Thus, the retry operation is performed only for the first occurrence of the erroneous instruction. In subsequent occurrences, the operation of the processor in the interlock mode is necessary only for the erroneous microinstruction. This provides for a smoother flow of the pipeline processing. It is important to note that the amount of time required for interlock mode operation for one microinstruction is considerably shorter than that for a retry operation.

Figure 2A:
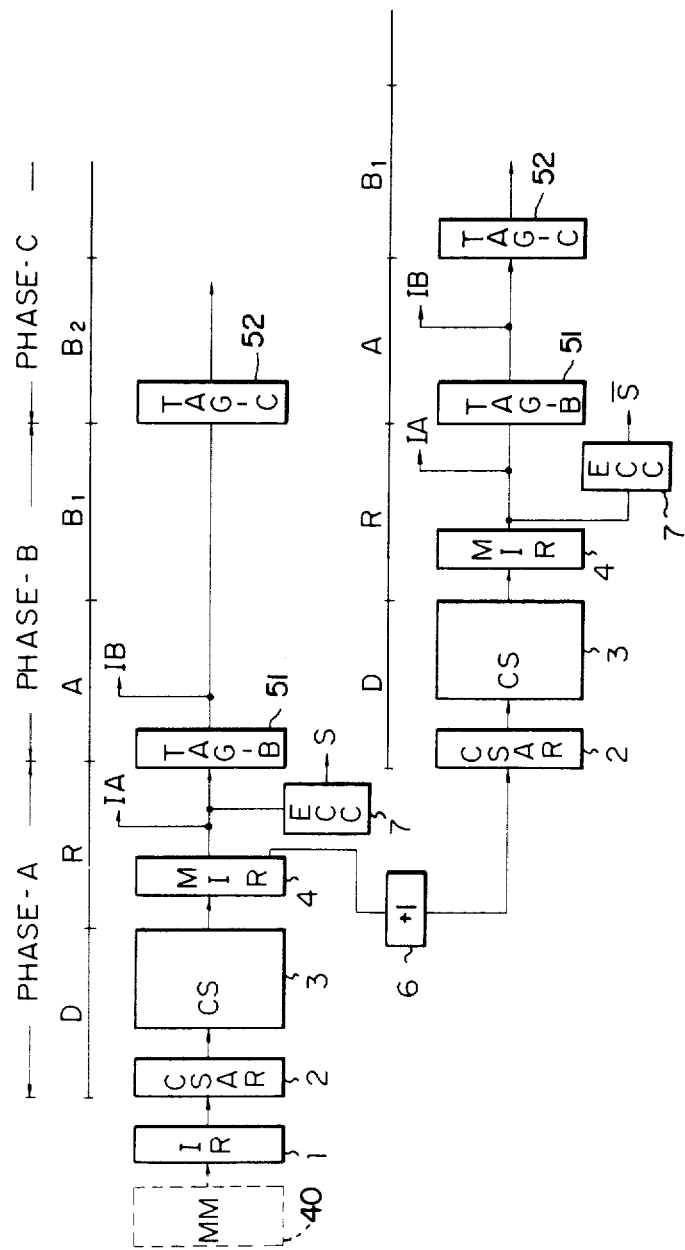
FIG. 2A is a timing chart explaining normal operation of the processing unit in FIG. 1.
Figure 2B:
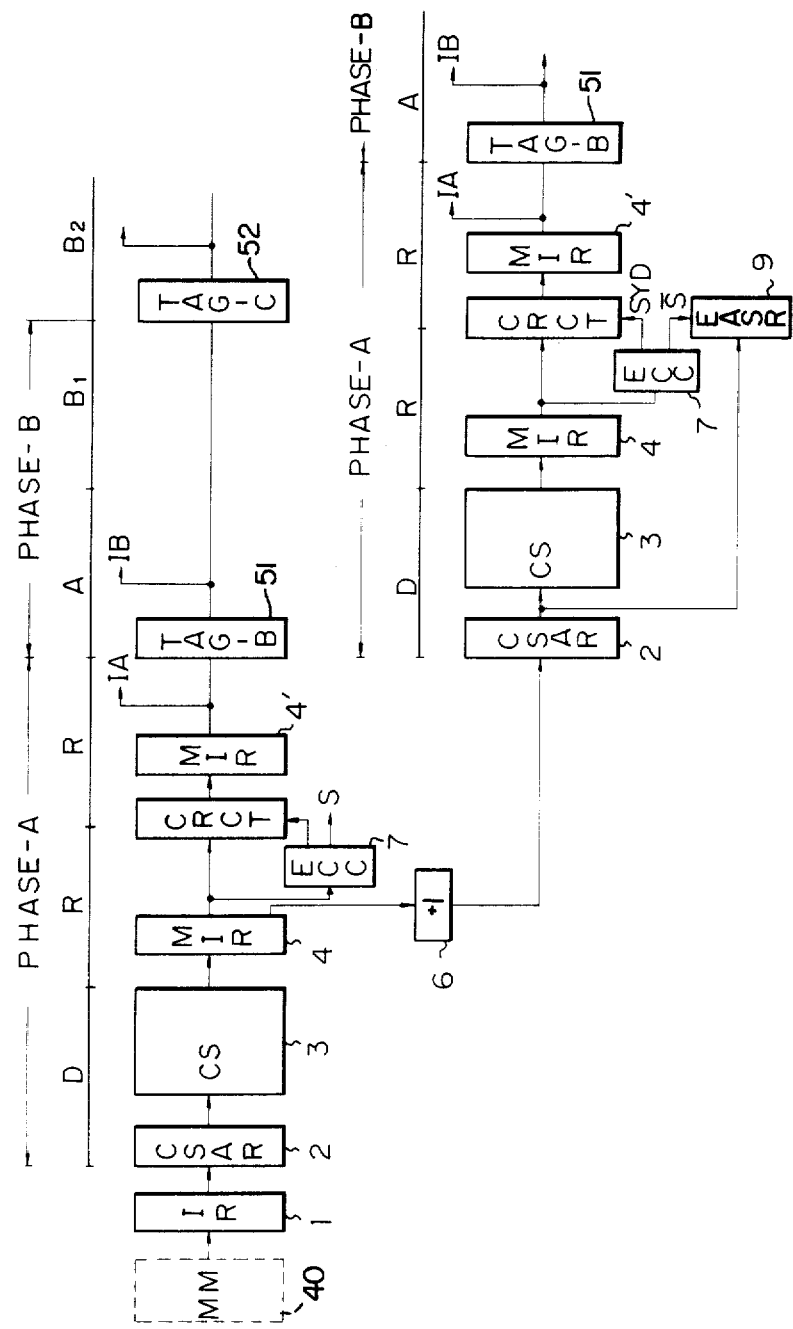
FIG. 2B is a timing chart explaining an initial retry operation according to the present invention.
Figure 2C:
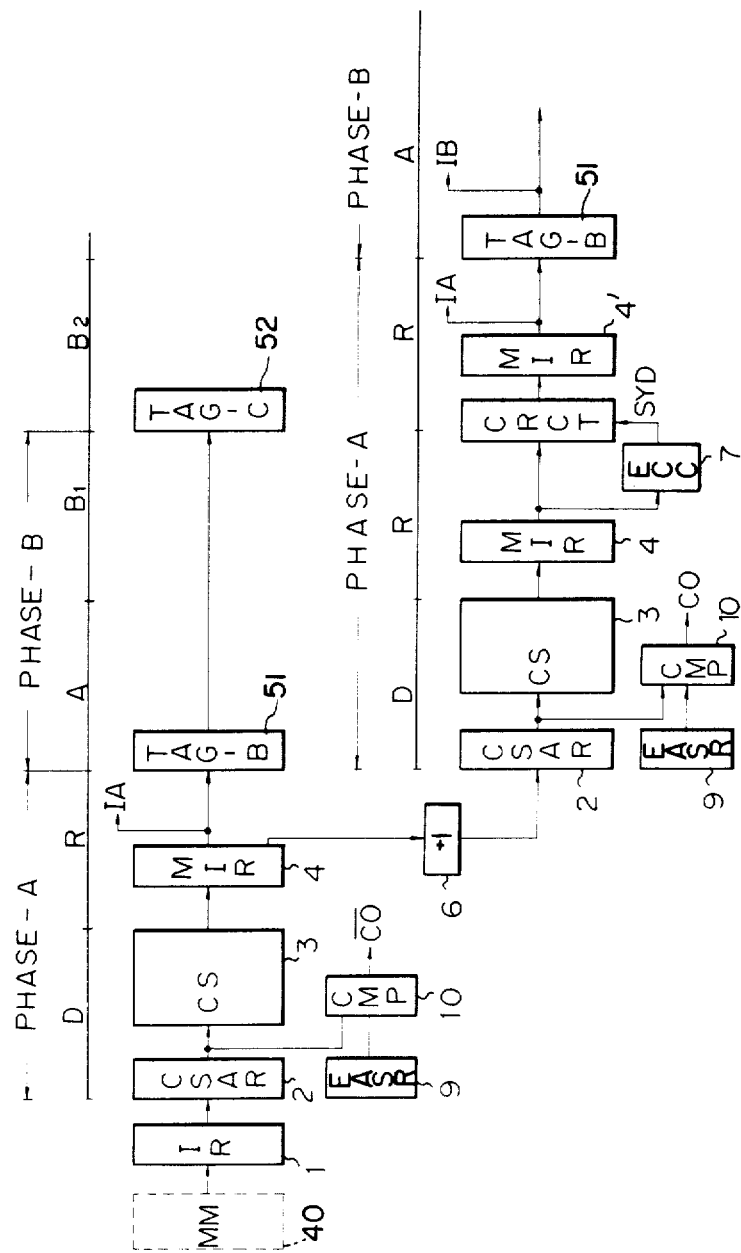
FIG. 2C is a timing chart explaining recovery from a second or later occurrence of an error according to the present invention.

The method according to the present invention will be clarified by reference to FIGS. 2A, 2B, and 2C. FIG. 2A is a timing chart for the normal operation of a pipeline processor. In FIG. 2A, as well as FIGS. 2B and 2C, the main memory (MM) 40, the instruction register (IR) 1, the control storage address register (CSAR) 2, the control storage (CS) 3, the microinstruction register (MIR) 4, tags B 51 and C 52, the address increment circuit ($-1$) 6, and the error detection and correction (ECC) circuit 7 are identical to those illustrated in FIG. 1.

The operation stages are segmented into PHASE-A, PHASE-B, PHASE-C, and so on, as diagrammed. PHASE-A, contains a step D, i.e., a decoding cycle, and a step R, i.e., a register read cycle. PHASE-B contains a step A, i.e., an address calculation cycle, and a step $B_1$, i.e., a buffer read cycle. PHASE-C contains a step $B_2$, i.e., another buffer read cycle. These steps are advanced in synchronism with a so-called machine cycle. It should be understood that the above steps are merely examples and are in practice determined according to the architecture of each machine (processing unit).

The flow of the data from the memory (MM) 40 to the MIR 4 is as described above. A portion IA of the microinstruction being processed is used for the operation of the phase-A stage of the processing unit. Simultaneously, the microinstruction is checked by the ECC circuit 7. If the ECC circuit 7 finds no error in the microinstruction, it issues a signal S. The increment circuit 6 then generates the next address for the CSAR 2 and an identical operation is carried out on the next microinstruction specified thereby. If the ECC circuit 7 finds an error, in this next microinstruction, it issues a signal $\overline{S}$. This immediately stops the pipeline operation and initiates the retry operation.

FIG. 2B is a timing chart for a retry operation according to the present invention. The retry operation is achieved under the interlock mode. That is, the ECC circuit 7 checks each microinstruction by using the ECC. If the microinstruction is correct, a dummy correcting operation "CRCT" is performed and the microinstruction remains essentially the same. It should be noted that the MIR register 4' is the same register as the MIR 4, but is illustrated separately in FIG. 2B to indicate the changes which can occur in the MIR 4.

On the other hand, if the microinstruction is not correct, the ECC circuit 7 issues the signal $\overline{S}$. At this time, the correcting operation "CRCT" for the erroneous microinstruction is carried out by a so-called syndrom SYD generated from the circuit 7. The thus corrected microinstruction is loaded into the MIR 4'. In this case, the signal $\overline{S}$ activates the EASR 9 to record the address in the CSAR 2 for the erroneous microinstruction.

As is apparent in FIG. 2B, the retry operation is somewhat redundant, because each of the microinstructions is dealt with in not one step, but two successive steps, i.e., the doubled steps R, due to the interlock mode. However, there is an advantage in that all of the microinstructions are therefore guaranteed correct. The most important advantage is that once a retry operation is performed for a certain erroneous microinstruction, it need not be performed again for the microinstructions preceding the same erroneous microinstruction in the future.

FIG. 2C is a timing chart for the processing of a second or later occurrence of an erroneous microinstruction according to the present invention. As mentioned above in reference to FIG. 2B, once a retry operation has been effected due to an erroneous microinstruction, the address specifying that microinstruction is recorded in the EASR 9. The comparing circuit 10 continually compares the address in the CSAR 2 with the address in the EASR 9. If the comparison indicates no coincidence "$\overline{CO}$" between the address, the pipeline operation continues as usual. If the comparison indicates coincidence "CO" therebetween, the processor operates under the interlock mode for the erroneous microinstruction only. That is, the correcting operation "CRCT" is carried out by the syndrom SYD based on the related ECC to correct the erroneous microinstruction and restore it in the MIR 4'. In this case, the step R is doubled due to the interlock mode. However, such doubled steps for a single microinstruction take considerably less time than that required for the usual retry operation.

Figure 3:
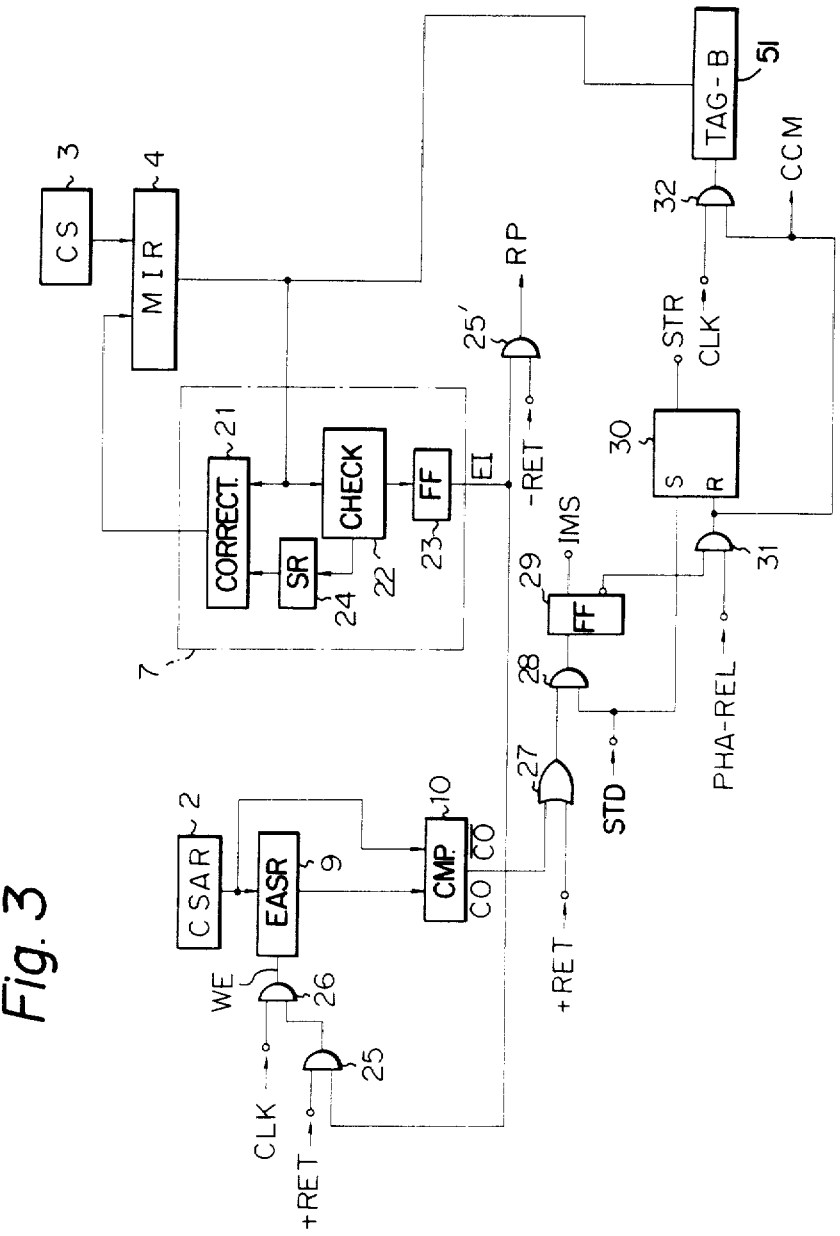
FIG. 3 is a detailed example of a part of the circuit illustrated in FIG. 1.

FIG. 3 is a detailed example of a part of the circuit illustrated in FIG. 1 mainly depicting the ECC circuit 7, the timing control circuit (TC) 8, and the clock control circuit (CLK) 11. The ECC circuit 7 receives data including a so-called hamming code and applies the data to both a correcting circuit 21 and an error check circuit 22. The error check circuit 22 activates both an error-indicating flip-flop 23 and a register 24 storing the syndrome used for correction of the erroneous microinstruction. The error indication signal EI of logic "1", if an error exists, is supplied from the flip-flop 23 to both AND gates 25 and 25'. If the retry operation is not being performed, a signal −RET is provided from a retry processing circuit RP (not shown). If the retry operation is being performed, a signal +RET is provided.

When the signal −RET and the error indication signal EI are both active, the output from the AND gate 25' triggers the RP circuit to commence the retry operation. When the signal +RET and the signal EI are both active, the output of the AND gate 25 opens an AND gate 26 to permit passage of a clock signal CLK as a write enable signal WE, so that the address of the erroneous microinstruction in the CSAR 2 is recorded in the EASR 9.

The recorded address is compared by the comparing circuit 10 with the address in the register 2 to produce the aforesaid coincidence signal CO or noncoincidence signal $\overline{CO}$. The signal CO and the signal +RET are input to an OR gate 27. If a status signal STD indicates that the presently executing stage is step D (refer to FIGS. 2B and 2C), an AND gate 28 is opened to permit passage of the signal CO, in the case of a subsequent processing (FIG. 2C), or the signal +RET, in the case of a retry (FIG. 2B).

The output from the AND gate 28 sets a flip-flop 29, the output of which indicates the interlock mode state IMS. The signal STD, on the other hand, sets a flip-flop 30 at its set input S, the output STR of which indicates that step R is now being executed. The flip-flop 30 is reset by a status signal of PHA-REL which is produced, in a conventional pipeline processor, for permitting a transition of state from PHASE-A to the PHASE-B.

If the signal PHA-REL is directly applied to the flip-flop 30 at its reset input R, the doubled steps of R (refer to FIGS. 2B and 2C) would not be obtained. Therefore, the signal PHA-REL is applied to the input R of flip-flop 30 via an AND gate 31. The AND gate 31 is opened when the inverted output of the flip-flop 29 is logic "1". In other words, only when the interlock mode state IMS is logic "1", is the AND gate 31 held closed and the step R doubled. When the interlock signal IMS is logic "0", the extend signal PHA-REL passes through the AND gate 31, resets flip-flop 30, is used to open and AND gate 32 and is further supplied to another clock control means CCM.

We claim:

1. A method for recovering from an error in a microprogram-controlled unit, the microprogram-controlled unit comprising a control storage for storing microinstructions, a control storage address register for storing an address specifying one of the microinstructions, a microinstruction register for storing a specified microinstruction, serially connected registers (tags) in stages following the microinstruction register for storing microinstructions during processing, an error detection and correction circuit for performing a validity check on the specified microinstruction stored in the microinstruction register and correcting erroneous microinstructions, an error address storage for storing the address of the specified microinstruction when an error is detected, and a comparator for comparing the addresses in the control storage address register and the error address storage, the validity check by the error detection and correction circuit for each of the microinstructions being carried out in parallel with the processing of each of the microinstructions, said method comprising the steps of:
    (a) detecting an erroneous microinstruction when the specified microinstruction contains an error;
    (b) performing a retry operation for related microinstructions, including the erroneous microinstruction, in an interlock mode in which the erroneous microinstruction and the related microinstructions preceding the erroneous microinstruction are successively subjected to error detection and correction, followed by reexecution;
    (c) recording an address specifying the erroneous microinstruction in the error address storage;
    (d) determining whether the address for the erroneous microinstruction is again stored in the control storage address register; and
    (e) performing an operation in the interlock mode for the erroneous microinstruction only, when the address for the erroneous microinstruction is again stored in the control storage address register.

2. A method as set forth in claim 1,
    wherein the error address storage is an error address storing register, and
    wherein step (d) includes comparing the address in the control storage address register with the recorded address specifying the erroneous microinstruction stored in the error address storing register.

3. A method as set forth in claim 2, wherein the address recorded in step (c) is recorded only if the erroneous microinstruction has a fixed error.

4. A method as set forth in claim 3, wherein step (c) records the address specifying the erroneous microinstruction stored in the control storage address register when an error is detected during step (b).

5. A method as set forth in claim 1,
    wherein the microprogram-controlled unit processes microinstructions in steps and uses a machine cycle for each of the steps, and
    wherein the interlock mode is created by doubling one of the steps defined by the machine cycle of the microprogram-controlled unit.

6. A method for recovering from an error in a microprogram-controlled unit which processes microinstructions, said method comprising the steps of:
    (a) detecting an erroneous microinstruction;
    (b) performing a retry operation on the first occurrence of the erroneous microinstruction, the retry operation including reprocessing any related preceding microinstructions as well as processing the erroneous microinstruction and related following microinstructions, in an interlock mode which includes detecting and correcting errors prior to the processing and reprocessing;
    (c) determining subsequent occurrences of the erroneous microinstruction; and
    (d) performing a microinstruction processing operation in the interlock mode, on the subsequent occurrences of the erroneous microinstruction, for the erroneous microinstruction only.

7. A method as recited in claim 6, wherein step (b) includes the step of recording data specifying the erroneous microinstruction.

8. A method as recited in claim 7, wherein each of the microinstructions are specified by data and step (c) includes the step of comparing the data specifying each of the microinstructions with the data specifying the erroneous microinstruction prior to processing each of the microinstructions.

9. A method as recited in claim 8, wherein the data specifying the erroneous microinstruction and each of the microinstructions is an address of the erroneous microinstruction and each of the microinstructions, respectively.

10. A method as recited in claim 6,
wherein the microprogram-controlled unit processes microinstructions in steps and uses a machine cycle for each of the steps, and
wherein the interlock mode is created by using two machine cycles for one of the steps.

* * * * *

UNITED STATES PATENT AND TRADEMARK OFFICE
CERTIFICATE OF CORRECTION

PATENT NO.   :   4,566,103

DATED        :   January 21, 1986

INVENTOR(S)  :   Sato et al.

It is certified that error appears in the above-identified patent and that said Letters Patent is hereby corrected as shown below:

Col. 3, line 51, "(-1)6," should be --(+1)6,--.

Col. 4, line 25, "from" should be --in--;
"circuit" should be --ECC circuit--;
line 49, "address," should be --addresses,--.

Signed and Sealed this

Thirteenth Day of May 1986

[SEAL]

Attest:

DONALD J. QUIGG

Attesting Officer

Commissioner of Patents and Trademarks